(12) United States Patent
Shaw

(10) Patent No.: US 8,359,638 B2
(45) Date of Patent: *Jan. 22, 2013

(54) APPLICATION OF DYNAMIC PROFILES TO THE ALLOCATION AND CONFIGURATION OF NETWORK RESOURCES

(75) Inventor: Venson M Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/854,453

(22) Filed: Aug. 11, 2010

(65) Prior Publication Data

US 2010/0323690 A1 Dec. 23, 2010

Related U.S. Application Data

(63) Continuation of application No. 10/462,948, filed on Jun. 16, 2003, now Pat. No. 7,802,292.

(60) Provisional application No. 60/446,129, filed on Feb. 10, 2003.

(51) Int. Cl.
*H04L 29/06* (2006.01)
(52) U.S. Cl. ............ 726/4; 380/247; 380/250; 709/225; 709/226
(58) Field of Classification Search .................. None
See application file for complete search history.

(56) References Cited

U.S. PATENT DOCUMENTS

| 6,088,732 | A | * | 7/2000 | Smith et al. | 709/229 |
| 7,123,909 | B2 | * | 10/2006 | Nakamura et al. | 455/432.3 |
| 7,802,292 | B2 | * | 9/2010 | Shaw | 726/4 |
| 2003/0167329 | A1 | * | 9/2003 | Kurakake et al. | 709/226 |

* cited by examiner

*Primary Examiner* — Kaveh Abrishamkar
(74) *Attorney, Agent, or Firm* — Moazzam & Associates, LLC

(57) ABSTRACT

A service request is received and associated with a subscriber id. Profile information is accessed for the source of the service request. A copy of the profile information is stored in a network element employed by the source of the service request to access the network.

20 Claims, 9 Drawing Sheets

APPLICATION OF DYNAMIC PROFILES TO THE ALLOCATION AND CONFIGURATION OF NETWORK RESOURCES

This application is a continuation of U.S. patent application Ser. No. 10/462,948, filed Jun. 16, 2003, now U.S. Pat. No. 7,802,292, which claims priority to U.S. Provisional Patent Application Ser. No. 60/446,129, filed Feb. 10, 2003, the contents of which are hereby incorporated by reference herein in their entirety into this disclosure.

FIELD

The invention relates to communications, and, more particularly, to communication via a network.

BACKGROUND

Wireless telephones are popular, ubiquitous devices. It is now possible to make and receive phone calls from almost any place in the world. Communication is even possible from remote and undeveloped areas using wireless satellite telephones. Herein, the term wireless telephone refers to any device capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (WLAN) protocols, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring® A variety of producers also provide wireless devices comprising versions of the Microsoft® Windows® operating software.

Third generation (3G) wireless devices provide high-bandwidth wireless access to communication networks. With such devices it may be possible to provide services to wireless devices such as streaming video, multimedia messaging, and so forth. Users of the network may, at different times, employ different devices to access the network. The quality and availability of services may vary according to the capabilities of the device employed for access (terminal device), the access device's present operating environment, and other dynamic parameters. The greater variety of services and terminal devices presents a challenge for allocating and managing network resources.

SUMMARY

In one embodiment, a method includes accessing profile information of a subscriber to identify services to which the subscriber has access, verifying that the subscriber is authorized to access a requested service, comparing requirements for delivering the service with available network resources, and, when sufficient network resources are available to deliver the service, allocating network resources in accordance with the requirements for delivering the service.

In another embodiment, a network includes an HLR comprising profile information for subscribers of the network, and an MSC comprising logic to access the profile information upon receiving a service request, and to identify a subscriber that is the source of the service request, and to access the profile information to verify that the subscriber is authorized to receive a requested service, and to access from the HLR a service profile for the requested service and to allocate network resources according to the service profile to deliver the service to a terminal of the subscriber.

In another embodiment, a method includes detecting an error condition on a terminal device, accessing terminal information for the terminal device, and applying the terminal information to remove the error condition.

In another embodiment, a method includes receiving a service request, associating a subscriber id with the service request, accessing profile information for the source of the service request, and allocating network resources according to profile information for the source of the service request and profile information of the service requested.

In another embodiment, a network element includes a router to route communications in a communication network, and logic access a service profile in response to a service request and to allocate network resources to fulfill the service request according to service requirements of the service profile.

FIGURES

The invention may be better understood with reference to the following figures in light of the accompanying description. The present invention, however, is limited only by the scope of the claims at the concluding portion of the specification.

DESCRIPTION

In the following description, references to "one embodiment" or "an embodiment" do not necessarily refer to the same embodiment, although they may. In the figures, like numbers refer to like elements.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Logic may be formed from combinations of software and hardware.

"Terminal device" refers to any device employed by a user (typically a person but also possibly an autonomous or semi-autonomous device system) to access the network environment.

"User" refers to any person (or, conceivably, autonomous or semi-autonomous logic) with access privileges to the network. Typically the user is the operator of a terminal device, although a user could also be the operator of a device or devices that provide services via the network.

A "subscriber" represents one or more persons or entities (corporations, partnerships, agents, operators, etc.) with access privileges to the network. A subscriber may be or represent a single user, or may represent one or more users.

A "service provider" is any device or combination of devices that provides information via the network environment. Typically, a service provider provides information delivery to terminal devices, and/or performs network actions in response to requests from terminal devices. A service provider may also provide information delivery and/or network actions on behalf of another service provider.

A "service request" is a communication to the network to cause the network to perform one or more acts. Often, the service request involves a request for the network to communicate information from or deliver information to a terminal device or service provider.

A "network element" is any one or more devices of a communication network, e.g. devices that participate at least occasionally in the operation of the network.

Typically, a subscriber will enter into contractual arrangements with a network operator for access rights to the operator's network(s). Networks of this operator for which the subscriber has access rights are the subscriber's "home networks." Networks other than the home networks of the subscriber are "roaming networks."

Figure 1:
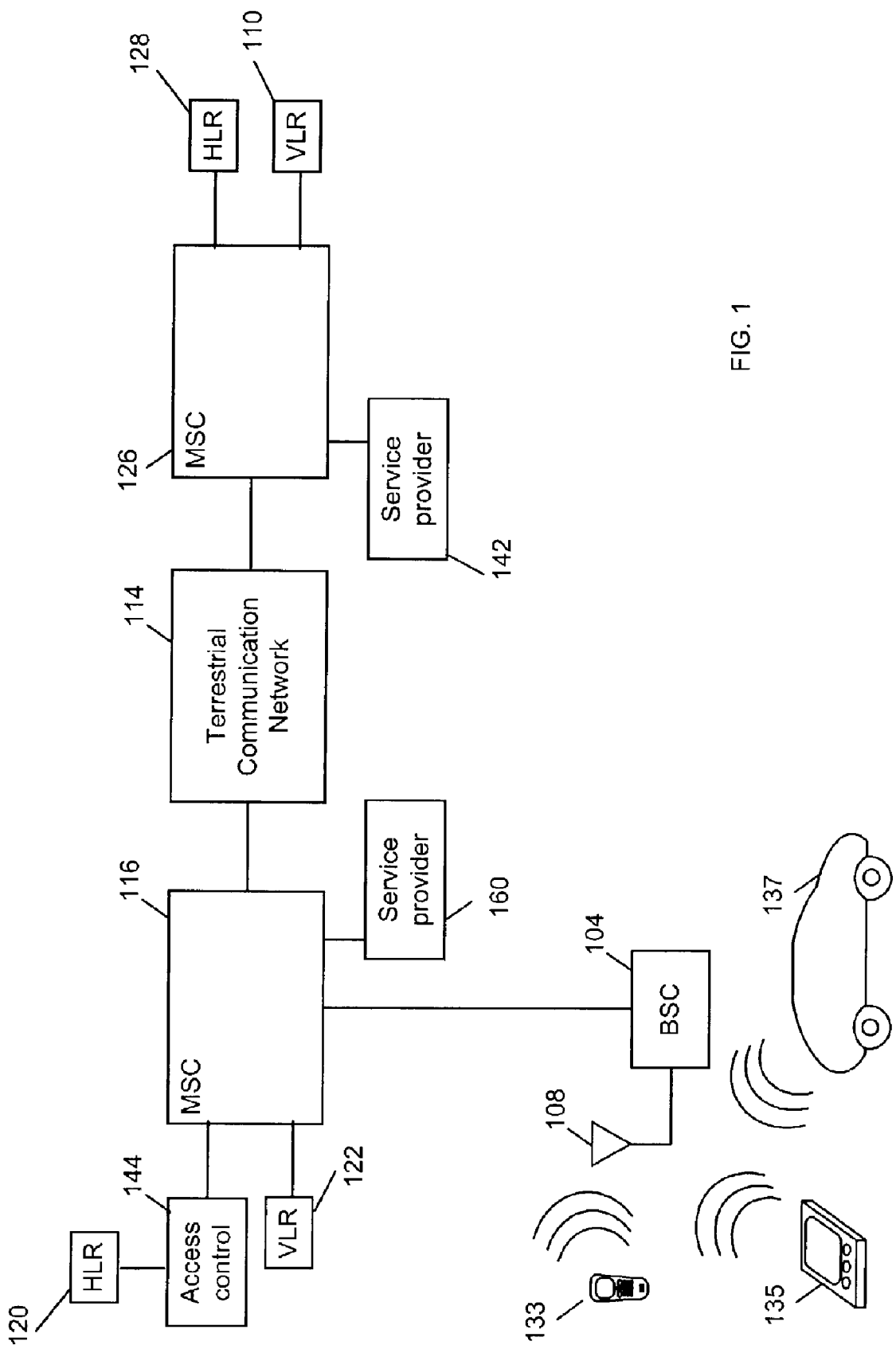
FIG. 1 is a block diagram of an embodiment of a communication network.

FIG. 1 is a block diagram of an embodiment of a wireless network environment. A base station controller (BSC) 104 network element is coupled to an antennae 108, typically via a Base Transceiver Station (BTS, not shown). The network may comprise multiple BSCs, each coupled with multiple BTSs and antennae. A single user may, at different times, access the network using a plurality of terminal devices, such as a wireless telephone 133, a wireless personal digital assistant (PDA) 135, and a wireless automotive computer (a processor coupled to logic) within an automobile 137. The antennae 108 may receive wireless signals from each of these devices.

Different terminal devices may employ different wireless technologies to access the network. For example, a wireless telephone or automotive computer may employ analog mobile phone service (AMPS), circuit switching, packet switching, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and/or universal mobile telecommunications service (UMTS). A PDA may employ wireless local area network (WLAN) and/or Bluetooth technology (technology defined by the Bluetooth Special Interest Group, such as but not limited to versions of the Bluetooth Core Specification and addendums and revisions thereof).

The BSC 104 is coupled to a mobile switching center (MSC) 116 network element that is responsible, among other things, for routing calls and communications to their appropriate destination. In GPRS networks, a Serving GPRS Support Node (SGSN) may perform functions similar to those provided by the MSC. Herein, the term "MSC" shall be used in reference to a mobile switching center, a serving GPRS Support Node, or any device or combination of devices performing similar functions.

Other components included in a typical MSC 116, such as memory, routing circuits, and various input/output devices, have been omitted for clarity of discussion. The MSC 116 is coupled to a terrestrial (non-wireless) communication network 114 to enable, among other things, communication with wired devices such as home and business telephones. The MSC 116 is coupled by way of the terrestrial communication network 114 to a second wireless communication network comprising a second MSC 126. Each network may comprise multiple MSCs.

A service provider 160 is coupled to MSC 116 to provide services such as streaming video, multimedia messaging (for example, to help enable the Multimedia Messaging Service, or MMS, which provides for the communication of video and other advanced multimedia formats), and so on. A similar service provider 142 is coupled to MSC 126.

A Home Location Registry (HLR) 120 stores records (collections of data) for subscribers to the network comprising MSC 116. A second HLR 128 performs a similar function for the network comprising MSC 126.

The access privileges of a service provider may be obtained by way of paid subscriptions (monthly fees, prepaid amounts, etc.) to the network operator. The access privileges may enable access to services available by way of the network. For example, a subscriber of the network comprising MSC 116 may access the services of the service provider 160. In some embodiments, a subscriber may also have access privileges to services of a roaming network. This may be accomplished in various ways, for example, by way of the subscription plan to the subscriber's home network, or dynamically by way of a pay-as-you-go scheme. For example, a subscriber of the network comprising MSC 116 may access the services of the service provider 142 on a pay-as-you-go transaction basis.

When a device is roaming on the network (e.g. the user of the device is subscribed to a network other than the one that the device is accessing), subscriber information for a user of the device may be stored in a Visitor Location Registry (VLR) 122. The network comprising MSC 126 also comprises a VLR 110.

In another embodiment, the subscriber information may be stored by a network element such as a Home Subscriber Server (HSS) that is shared by one or more networks of the network environment.

An access control network element 144 controls access to the subscriber information stored by the HLR 120. The access control 144 ensures that only those network elements of the network environment which are authorized to access the subscriber information may do so. In one embodiment access control is provided according to an id/password scheme. The access control 144 is shown as a stand-alone network element for clarity of explanation. In practice, it may be a stand-alone device or functionally incorporated into one or more other network elements, such as the HLR 120.

Figure 2:
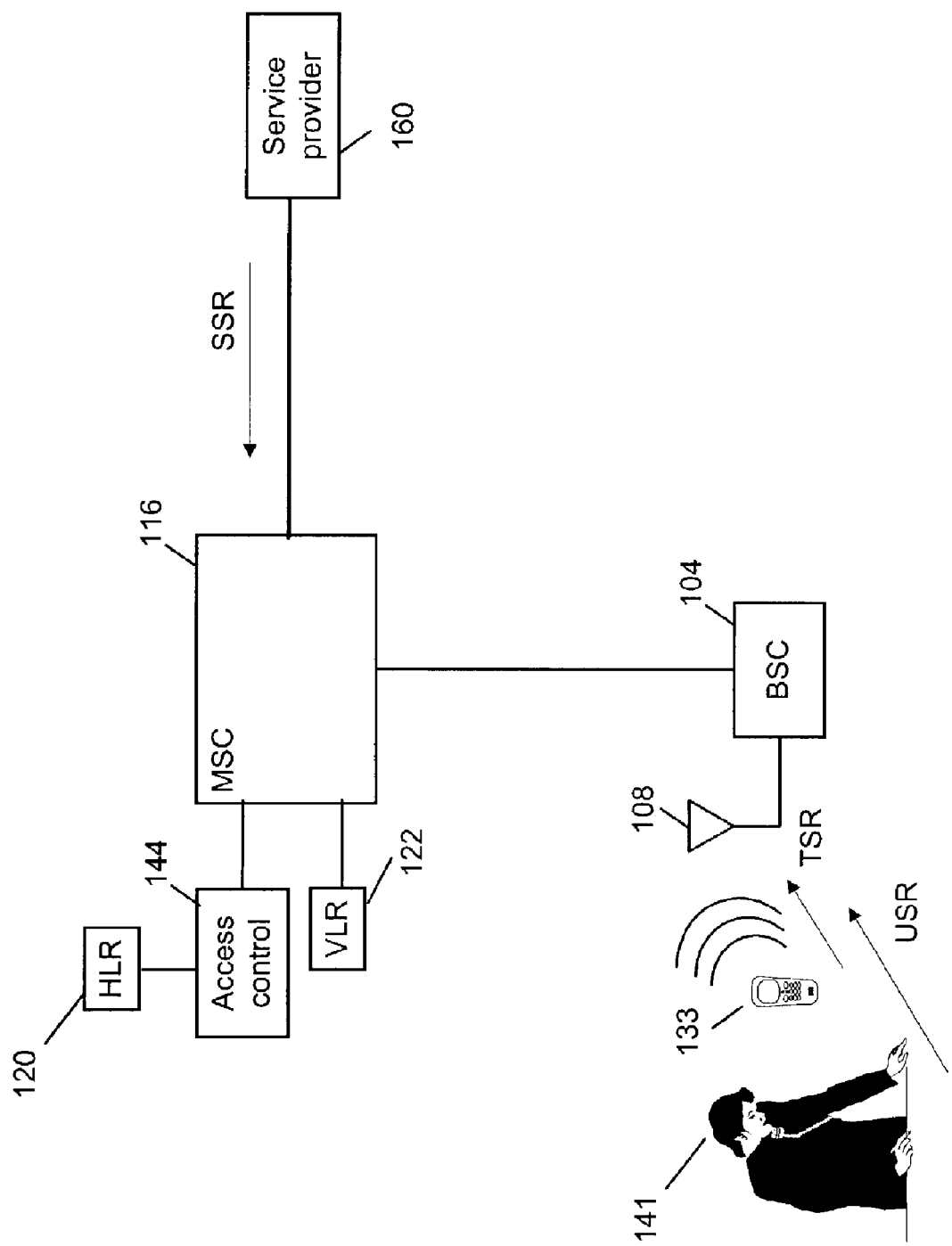
FIG. 2 is a block diagram of an embodiment of a communication network.

FIG. 2 is a block diagram of a wireless network wherein service requests originate from terminal devices, users, and service providers. A service request is a communication to the network to cause the network to perform one or more acts. A terminal device 133 may originate a terminal service request (TSR), for example, in order to activate service so that the network recognizes and authorizes access by the terminal device 133. A user 141 of a terminal device 133 may originate a user service request (USR) in order to access a service (stock quotes, instant messaging, etc.) with the terminal device 133. A service provider 160 may originate a service provider service request (SSR) in order to access the services of another service provider. For example, in order to respond to a request to communicate a message including a video clip, a service provider to provide multi-media messaging may request the services of a streaming video provider.

Some common types of network service requests are subscription management service requests, multimedia messaging service requests, and terminal management service requests. A subscription management (SM) service request pertains to creating, updating, and maintaining a subscriber's access privileges to the network. A multimedia messaging (MM) service request pertains to the communication of text, graphics, voice and non-voice audio, video, and other information types. A terminal management (TM) service request pertains to errors involving the use and configuration of terminal devices.

Logic (e.g. software) may be communicated from the network to a memory of a terminal device. The logic may operate to enable the terminal device to better receive a service of the network. For example, some services such as instant messaging may include a "client" software application that operates on the terminal device in cooperation with the service provider to enable instant messaging using the terminal device. Such software may not always operate properly on the terminal device, producing errors due to incompatible configuration of the terminal device, and resulting in a TM service request.

Service providers and network elements may act to alter the configuration of the terminal device in order to remove the error condition. Information about the terminal device's configuration and settings may assist in this process and may be stored by the network in a terminal profile.

Information about a terminal device's configuration and settings may also enable the network operator to provide new services to the terminal device without involving the user in reconfiguration of the terminal device.

Figure 3:
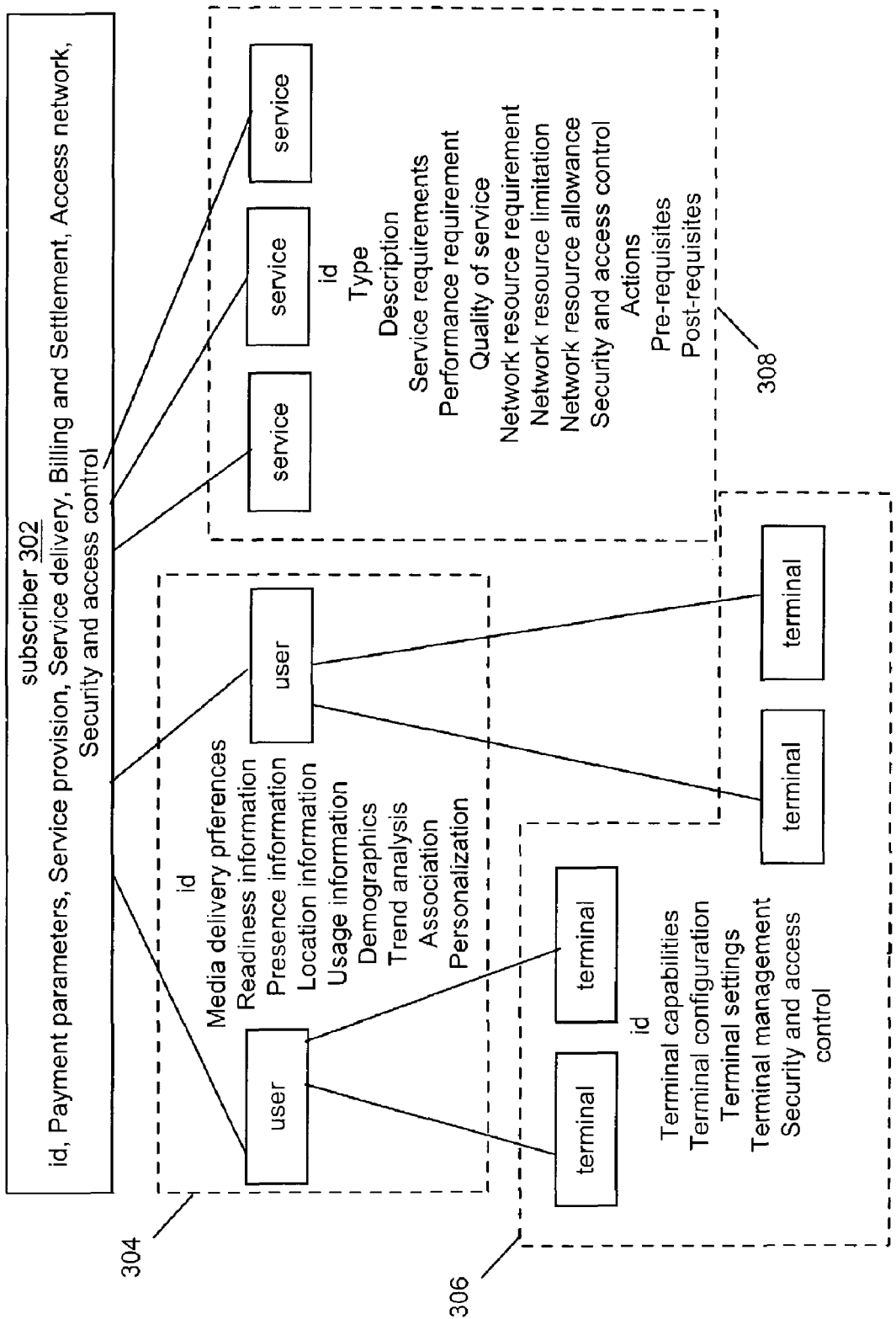
FIG. 3 is a block diagram of an embodiment of profile information.

FIG. 3 is a block diagram illustrating an embodiment of subscriber, user, terminal, and service profiles. The subscriber profile comprises information about a subscriber to a network. A user profile comprises information about a user of the network. A terminal device profile comprises information about a terminal device. A service profile comprises information about a service available via the network. Information of each type of profiles may be stored in a device memory, such as a memory of an HLR or VLR, and/or in the memories of other network elements.

In one embodiment, a subscriber profile 302 may comprise a subscriber id, payment parameters, service provision information, service delivery information, billing and settlement information, access network information, and security and access control information.

The subscriber id identifies a subscriber from among subscribers to the network.

Payment parameters describe the manner and terms of payment. Examples are monthly subscription charges, flat-fee arrangements, per-use arrangements, pre-paid amounts, and so on.

Service provision information describes a level or package of services available to the subscriber. Examples are premium, standard, and basic.

Service delivery information describes a level of service available to the subscriber from the network. Examples include 100 Mbps (megabit per second) service, and guaranteed information delivery.

Billing information describes how the subscriber is to be charged. This information may include the subscriber's billing address, credit or debit card information, and/or account numbers.

Settlement information describes information about current charges to the subscriber. Examples include information about the subscriber's current charges, and due and past-due charges.

Access network information describes the manners of network access the subscriber may employ. Examples include GPRS, 2G, 3G, and circuit switching.

Security information describes how the subscriber may protect information communicated to or from the network. Examples are digital signature and encryption key information.

Access control information describes how the subscriber may access information and/or acts available via the network. Examples include id and password information.

In one embodiment, a subscriber profile 302 may be associated with one or more user profiles 304. For example, a subscriber may represent multiple users when the subscriber is a corporation, partnership or other legal entity. The profile of such a subscriber may be associated with multiple user profiles, each representing a user represented by the subscriber. A subscriber profile 302 may also be associated with no user profiles, as when the subscriber is a service provider. However, in some cases even when the subscriber is a service provider, a user profile representing an operator of the service provider may be associated with the subscriber profile 302.

In one embodiment, a user profile of the user profiles 304 may comprise a user id, media delivery preferences, presence information, usage information, demographic information, association information, and personalization information.

The user id identifies a user from among users of the network.

Media delivery preferences include information about the manner in which information should be communicated to the user. Examples include frame rate, color schemes, visual quality, and visual layout.

Usage information comprises information about the user's access to the network environment, possibly including how, when, how often, and for what purpose the user accessed the network environment.

Usage information may include information about which services a user accesses and/or how often, and/or the most recently used and/or most frequently accessed services. The usage information may also comprise information about trends and patterns in the user's usage behavior. In one embodiment, this information or portions thereof is collected by the MSC 116 associated with the HLR 120. Where an HSS or other central storage location is employed by multiple networks, multiple MSCs may contribute to collection and storage of the usage information for terminals and/or users, and access control may be provided according to which MSC collected the information, and/or which MSC is comprised by a home network for the user and/or terminal.

Personal information describes a user. Examples are the user's name and address, as well as a user's privacy information (such as restrictions on distribution of the user profile information).

Demographic information may be used to classify a user for statistical, marketing, or other purposes. Examples include the user's age, race, and gender.

Association information describes other users and/or subscribers that have an association with the user. The association information may also describe the nature of the association. Examples include associates, family members, and patrons.

Personalization information describes a user's preferred, most recent, and/or most frequent settings for services that the user may access. Examples include a user's preferred type of news information (sports, local events, etc.) and a user's most frequent and/or most recent search queries.

Security information describes how the user may protect information communicated to or from the network. Examples are digital signature and encryption key information. In various embodiments the subscriber security information may be applied to protect the communications of the users associated with the subscriber. Alternatively, or in addition, the user security information may be applied to protect the communications of the users associated with the subscriber, independent of one another.

Access control information describes how the user may access information and/or acts available via the network. Examples include id and password information. In various embodiments the subscriber access information may be applied to provide the users associated with the subscriber access to restricted information. Alternatively, or in addition, the user access control information may be applied to provide the users associated with the subscriber independent access to the restricted information.

Each user profile may have zero or more associated terminal profiles 306. When the user represents an operator of a service provider, there may be no associated terminal profile.

In one embodiment, a terminal profile may comprise a terminal identifier, terminal capabilities, readiness information, presence information, location information, terminal configuration information, terminal settings, and security and access control information.

The terminal identifier identifies the terminal from among terminals that access the network. Examples of such identifiers are the Mobile Identification Number (MIN), the Mobile Station Identifier (MSID), Mobile Station Number (MSN), and International Mobile Station Identifier (IMSI).

Terminal capabilities comprises information about the terminal device's capabilities to receive, process, and display information. For example, terminal capabilities may comprise information about the terminals graphic display capabilities, communication bandwidth, and processor speed.

Readiness information comprises information about the terminal device's readiness to receive information from the network, for example, if the device is ready, not ready, sleeping, on standby, and so on.

Presence information comprises information about whether or not the user of the terminal device is currently present to operate and/or receive information via the terminal device. The readiness information and the presence information together may establish whether the terminal equipment is ready to receive, process, and display information, and whether the user of the terminal device is present to operate and/or receive information via the terminal.

Location information comprises information about the location of the device. Such information may be useful in determining the type of information to deliver, the quality and quantity of information to deliver, and so on. Location information may be 'literal', e.g. a geographic address or location, or 'logical', e.g. "In a Meeting", "In Transit", and so on.

Terminal configuration information may include information about the terminal device model, the version(s) of logic comprised by the terminal device (e.g. BIOS version, operating system version, etc.), the last know error to occur during the operation of the device, installed software applications, and language settings, among other things.

Terminal settings may comprise information about how the BIOS, operating system, installed software applications, and other components of the terminal device are configured to operate.

Security information describes how the terminal may protect information communicated to or from the network. Examples are digital signature and encryption key information. In various embodiments the subscriber security information and/or the user security information may be applied to protect the communications of the terminals associated with the subscriber and user. Alternatively, or in addition, the terminal security information may be applied to protect the communications of the terminals associated with a user independently of one another.

Access control information describes how the terminal may access information and/or acts available via the network to which access is controlled. Examples include id and password information. In various embodiments the subscriber access control information and/or user access control information may be applied to provide the terminals associated with a user access to restricted information. Alternatively, or in addition, the terminal access control information may be applied to provide the terminals associated with a user independent access to restricted information.

Each subscriber profile 302 may be associated with zero or more service profiles 308. Each service profile may comprise information about a service that is available to the subscriber. In one embodiment, each service profile comprises a service identifier, a service type, a service description, service requirements, performance requirements, quality of service information, network resource requirement information, network resource allowance information, and security and access control information.

The service identifier identifies the service from among services available via the network.

The service type identifies the type of service, e.g. business, consumer, entertainment, etc.

The service description describes the service, such as "Real-Time Stock Quotes".

Service requirements describe requirements for the service to be properly provided. For example, service requirements may include information about the graphics, processor, memory, communications, payment capacity, and other requirements that a terminal device, and/or user, and/or subscriber should meet in order for the service to be provided. The service requirement information may be organized according to categories, such as graphics, processor, memory, and communications. Of course these are merely examples of possible categories. The categories may be defined to correspond with the categories of the terminal capabilities. For example, the graphics category may comprise information about the graphics requirements to properly render the service information, information such as the display size, graphics processor, and colors that a terminal should employ to properly render the service information to the user. The processor category may comprise information about the processing capabilities that need be employed by the terminal device to properly receive and render the service (e.g. processor speed). The memory category may comprise information about the memory requirements to properly receive and render the service on a terminal device (e.g. minimum available memory, memory speed). The communication category may comprise information about the communication requirements to properly receive and render the service on a terminal device (e.g. bandwidth, codec).

Upon receiving a service request from a terminal device, the network may attempt to match corresponding categories of the terminal capabilities and service requirements to identify services that are compatible with the terminal.

Information of a payment requirements category of the service requirements may be compared with the payment parameters of the subscriber profile 302 to identify services that are within the subscriber's payment parameters.

Information of the user preference category of the service requirements may be compared with the media delivery preferences and/or personalization information of the user profile to identify services that can be delivered according to the user's preferences.

In one embodiment, the service requirements information may comprise information about the network actions to carry out in order to respond to a service request. The service requirement information may also comprise information about the pre-requisites to providing the service (e.g. non time-critical actions and/or settings to take place before performing the time-critical acts of responding to the service request). The service requirement information may also comprise information about the post-requisites of providing the service (e.g. non time-critical actions and/or settings to take place after performing the time-critical acts of responding to the service request).

When a service request is received, action information for the requested service may be accessed and compared with actions that are currently being performed by the network, and/or that are scheduled to be performed by the network. Those actions that are scheduled/under way and that are in common with the requested service may be referred to as "common actions."

Likewise, network resource requirement information for the requested service may be accessed and compared with network resources that are currently allocated by the network, and/or that are scheduled to be allocated by the network. Those resource requirements that are allocated/scheduled and that are in common with the requested service may be referred to as "common resources."

Quality of service information describes the quality of service that the service requires from the network.

Network resource requirement information describes the network resources that need be allocated in order to carry out the actions of the service. For example, the network resource requirement information may comprise bandwidth and memory allocation requirements. Network resource requirements may also include a relay server address and WAP gateway information, among other things.

The network allowance information describes the network resources actually made available to carry out the actions of the service. For example, a streaming video service may require 10 Mbps of network bandwidth to deliver streaming video to terminal devices. However only 1 Mbps of bandwidth may be allowed.

Security information describes how the information of the service is protected during communication over the network. Examples are digital signature and encryption key information.

Access control information describes how the service provider may access information and/or acts available via the network to which access is controlled. Examples include id and password information.

"Profile information" refers to all or portions of the subscriber, user, terminal, and service profiles. The profile information may be communicated from the home network to other networks. The profile information may be communicated in accordance with local and national privacy regulations.

The profile information may be employed by service providers and/or network elements of the network environment to determine the appropriate frame rate, frame size, compression ratio, quality of service, and so on for information delivery to terminal devices.

The profile information, such as the terminal capabilities, presence information, location information, and readiness information, may be updated dynamically as circumstances change. For example, if the user changes terminals after coming home from work, new terminal capabilities, readiness information, presence information, and location information for the user may be provided from the terminal to the network and stored. Terminal devices, service providers, network elements, and network operators are just some of the sources from which updates to the profile information may be derived.

In one embodiment, an attempt is made to access a service of a roaming network. A request to access the profile information associated with the subscriber, user, terminal device, or service provider that originated the request is communicated from the roaming network to the home network. The source of the service request is ascertained. The access control 144 of the home network determines if the request source is authorized to access the profile information. For example, the service provider 142 may request to access the terminal profile for the wireless telephone 133 when the wireless telephone 133 attempts to access the network comprising MSC 126. When the source of the request is authorized, all or portions of the profile information may be communicated from the HLR 120 of the home network to the VLR 110 or other storage location of the roaming network. The profile information may be transferred also or alternatively to the source of the service request.

The network may store and maintain a "network profile" comprising information about currently available network resources, expected short- and long-term demand for network resources, and currently allocated network resources, among other things. In one embodiment the network profile is stored by the HLR 120.

Figure 4:
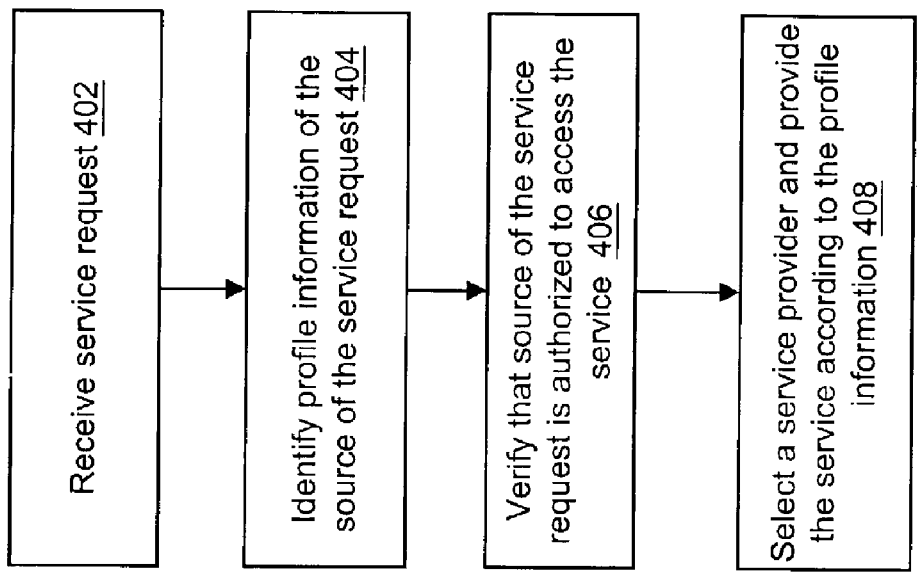
FIG. 4 is a flow chart of an embodiment of a method to respond to a service request.

FIG. 4 is a flow chart of an embodiment of a method of responding to a service request. At 402 a service request is received. The service request includes an identifier of the originator of the service request, e.g. a subscriber, a terminal device, a user, or a service provider. The service request may also include a service identifier. Profile information corresponding to the originating entity is identified in 404. At 406 it is verified that the source of the request is authorized to access the service. At 408 a service provider to respond to the service request, and media delivery parameters, network resources to allocate, and so on are selected according to the profile information of the source of the request.

Corresponding categories of the terminal capabilities, media delivery preferences, and service requirements may be compared to identify services compatible with the requesting user and/or terminal.

Information of the service requirements may be compared with the payment parameters of the profile information to identify services that are within the user's and/or subscriber's payment parameters.

Figure 5:
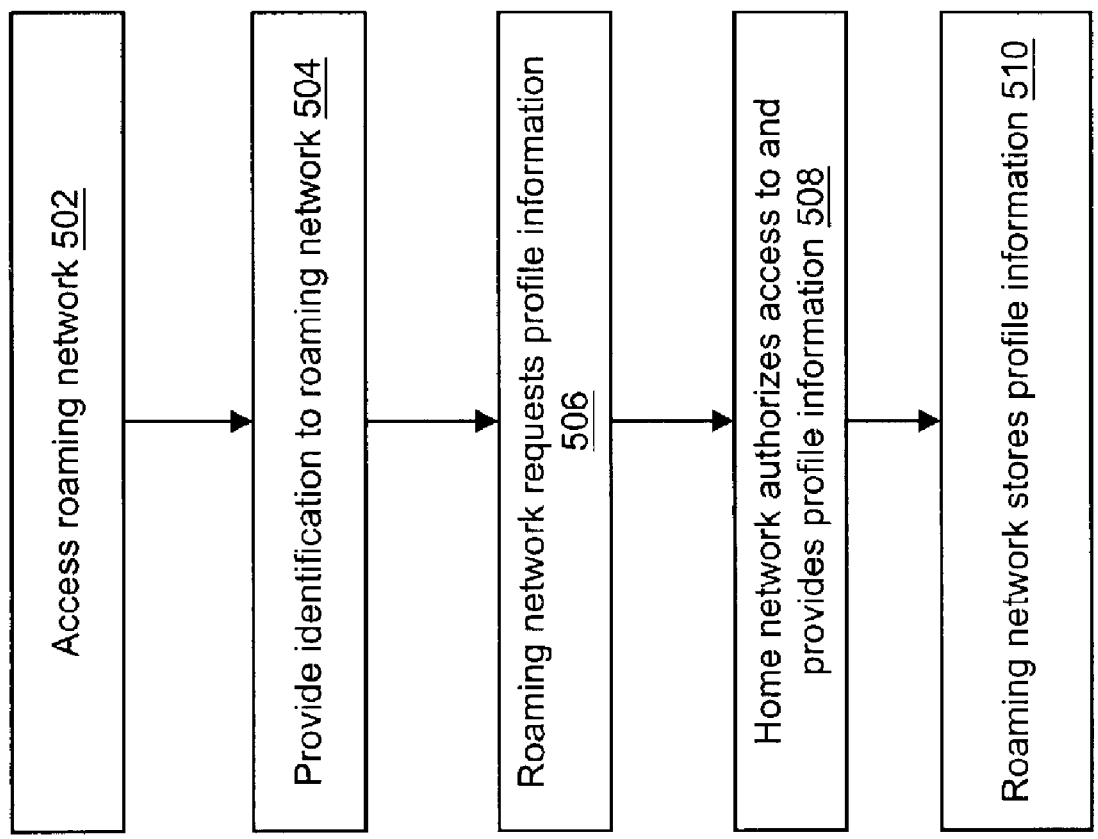
FIG. 5 is a flow chart of an embodiment of a method to access profile information.

FIG. 5 is a flowchart of an embodiment of a method to provide profile information to a roaming network and/or service provider thereof. At 502 a roaming network is accessed. At 504 a subscriber, user, and/or terminal identification is provided to the roaming network. The identifier may be provided as part of a service request. For example, a terminal identifier may be provided as part of a request by a terminal device to access a roaming network. At 506 the roaming network (e.g. a network element of the roaming network) and/or service provider thereof requests from the home network of the terminal, user, or subscriber profile information corresponding to the identification. Typically this will involve providing the identification to the home network, along with the request for at least part of the profile information. In one embodiment, access credentials (e.g. identification and password) for the profile information are provided along with the request. In another embodiment, the access credentials may be provided separately from the request. At 508 the home network verifies that the requesting network element and/or service provider is authorized to access the requested profile information, and provides the requested profile information. The roaming network stores the profile information at 510. For example, the roaming network may store the profile information in the in the roaming network's VLR.

In one embodiment, roaming network operators and/or service providers thereof may purchase subscriptions from or provide other compensation to the operator of the home network, in order to receive authorization to access the profile information of subscribers, users and/or terminals of the home network. Access may be limited to portions of the profile information. For example, some service providers may have access limited to terminal capabilities and media delivery preferences, sufficient to determine whether the service provider can provide adequate service to the user's terminal device. Other service providers may purchase subscriptions that provide access to usage information, such as those services most frequently and most recently used by the user. This information may prove useful for marketing purposes. The level of compensation for access may be set according to which of the profile information is made available for access. Of course, subscriptions are only one possible manner of compensating for access to the profile information. Other manners of compensation include transaction charges (pay-per use), charging a percentage of the service price, and so on.

Network elements and/or service providers may interact to exchange profile information in order to cooperatively improve service.

Templates may be created for types of terminals, users, subscribers, and/or services. Examples of types of terminal devices for which profile templates may be created include mobile phones, set-top boxes, and personal computers. Examples of types of users and/or subscribers for which templates may be created include business, consumer, and family. In one embodiment, the data fields of the templates and the relationships among the data fields may be defined according to the XML standard.

Figure 6:
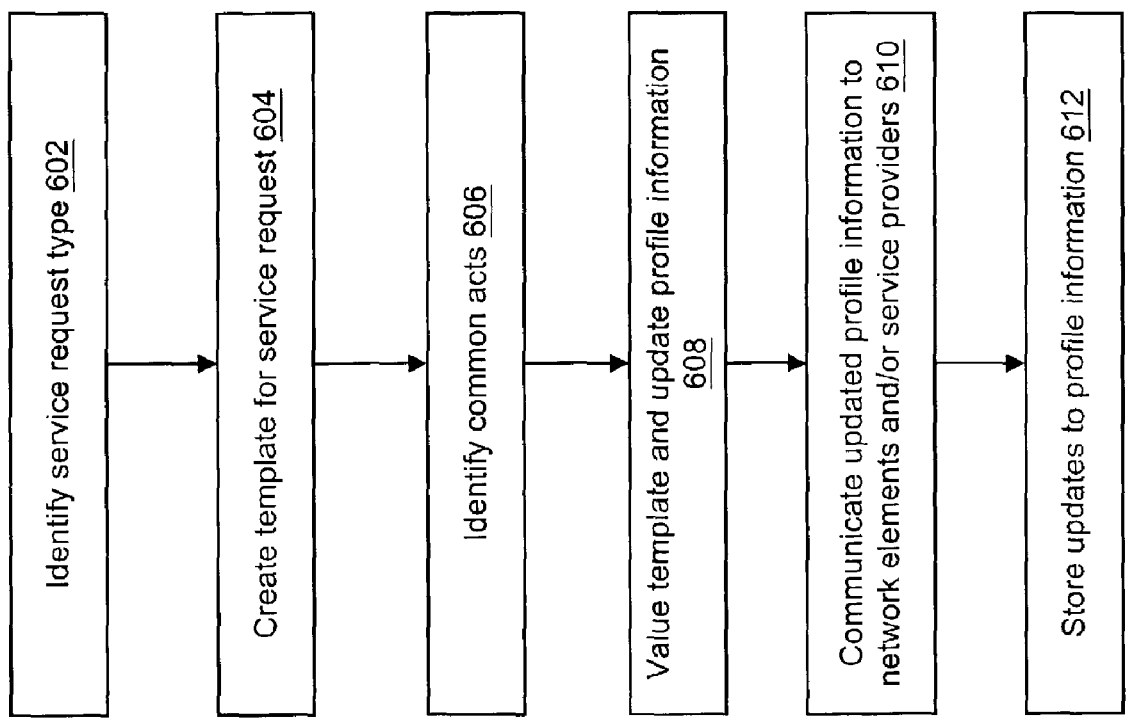
FIG. 6 is a flow chart of an embodiment of a method to respond to a service request.

FIG. 6 shows an embodiment of a method to respond to a service request. At 602 the service request is typed, e.g. classified as pertaining to a particular class of service requests, such as terminal management, multimedia messaging, and subscription management. Based on the type, and on profile information of the source of the service request, a template for carrying out the service request is created at 604. This template may include network resource requirements, media delivery parameters, payment preferences, usage information, and so on from the profile information of the source of the request. Acts common to the response to the service request and ongoing and/or scheduled acts of the network are identified at 606. At 607 the acts of the service request are carried out according to the template, and fields of the template are valued accordingly. For example, the usage information in the template may be updated to reflect the use of the service. At 608 profile information for the source of the service request is updated according to the fields of the template. At 610 the updated profile information is communicated to network elements and service providers of one or both of the home and roaming networks. Updates to the profile information are stored at 612.

Figure 7:
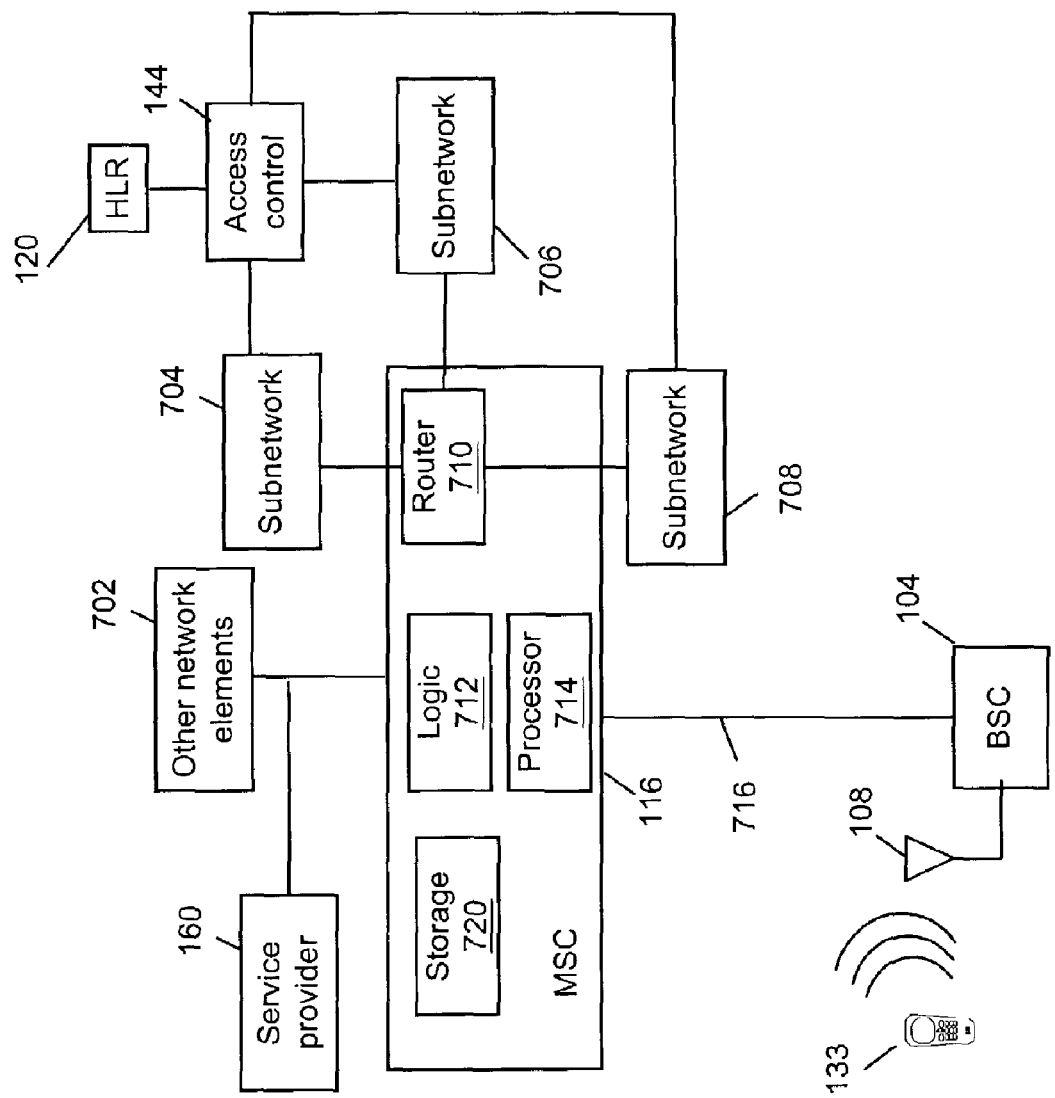
FIG. 7 is a block diagram of an embodiment of a communication network.

FIG. 7 is a block diagram of a network embodiment. The MSC 116 comprises at least one input 1016 to receive communications from one or more terminal devices 133. The MSC 116 may also receive communications from one or more other network elements 702 and/or service providers 160, via input 716 and/or other inputs. A processor 714 and logic 712 may operate cooperatively to form a classifier of the communications received from the terminal device(s) 133, service providers 160, and other network elements 702. In other embodiments, the classifier may be a separate network element that interfaces with the MSC 116 to monitor and classify communications.

The communication may be classified as a type of service request, e.g. terminal management, multimedia messaging, and subscription management. A router 710 may be employed to route the communications to one or more of a plurality of subnetworks (one or more network elements) 704, 706, 708, according to the classification. The subnetworks may operate to identify the source of the service request and to access relevant profile information of the source to carry out the service request.

The logic 712 and processor 714 may further operate on the communications to determine network usage information for terminal devices and/or users thereof, including a service usage history, a most recently used service, and a most frequently used service. This information may be routed to the appropriate subnetwork for updating of the profile information.

Figure 8:
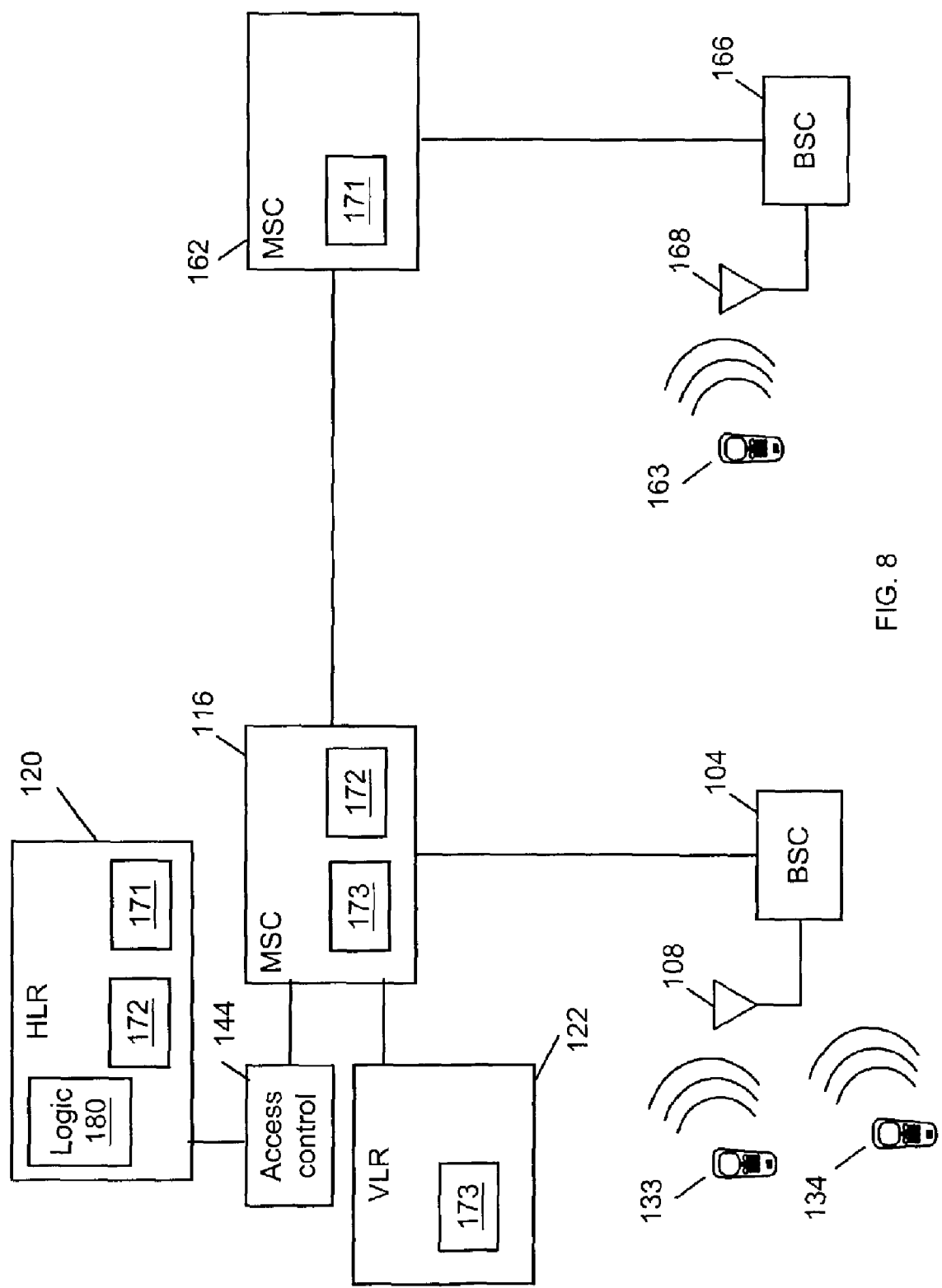
FIG. 8 is a block diagram of an embodiment of profile information distributed in a wireless communication network.

FIG. 8 is a block diagram of a network embodiment comprising distributed storage of profile information. A terminal 133 of a first subscriber of the network accesses the network via BSC 108 and MSC 116. A terminal 134 of a subscriber of a roaming network also accesses the network via BSC 108 and MSC 116. A terminal 163 of a second subscriber of the network accesses the network via BSC 166 and MSC 162.

The HLR stores, manages, and provides access control to profile information 171, 172 for all subscribers (including user and terminal profile information therefore) for which the network is the home network, e.g. the subscribers associated with terminals 133, 163.

The VLR stores profile information 173 for all parties (including user and terminal profile information therefore) that are presently roaming on the network, e.g. the subscriber associated with terminal 134.

The MSC 116 stores copies of profile information 172, 173 for those parties (including user and terminal profile information therefore) that access the network via the MSC 116, e.g.

subscribers associated with terminals 134, 136. These parties may include subscribers of the network and subscribers of a roaming network.

The MSC 162 stores copies of profile information 171 for those parties (including user and terminal profile information therefore) that access the network via the MSC 162, e.g. the subscriber associated with terminal 163. These parties may include subscribers of the network and subscribers of a roaming network.

In another embodiment, the BSC 104 may store copies of profile information 172, 173 for those parties (including user and terminal profile information therefore) that access the network via the BSC 104, e.g. subscribers associated with terminals 134, 136. Likewise, the BSC 166 may store copies of profile information 171 for those parties (including user and terminal profile information therefore) that access the network via the BSC 166, e.g. subscribers associated with terminals 163.

Copies of the profile information stored by the MSCs and/or BSCs may be more up-to-date than the copies stored by the HLR 120 and VLR 122. For example, the copy of profile information stored by an MSC may include updated usage statistics for the subscriber; the copy of profile information stored by a BSC may include updated terminal capabilities for the terminal of the subscriber.

The HLR 120 comprises logic 180 to create a "logical database" from the current copies of profile information distributed throughout the network. The logic 180 may operate such that updated copies of profile information from throughout the network appears, for the purposes of queries and other database functions, stored together in a central location.

Updates to copies of the profile information may be propagated back to the HLR 120. The updates may be communicated back to the HLR 120 and stored once the subscriber is no longer accessing the network via a particular MSC and/or BSC. For example, when a subscriber first accesses the network via MSC 116, the MSC 116 may retrieve a copy of the subscriber's profile information from the HLR 120. The MSC 116 may update the usage statistics of the profile information to reflect the subscriber's network activity while accessing the network via the MSC 116. The subscriber may then move to a geographic location wherein access to the network is provided via BSC 166 and MSC 162. As a consequence the MSC 116 may communicate the updates to the profile information to the HLR 120; the HLR 120 may store the updates into the copy of the profile information stored by the HLR 120. The MSC 162 may then retrieve from the HLR 120 the updated profile information for the subscriber. Logic of the MSCs and the HLR may operate to enable these interactions.

In another embodiment, the MSC 162 may retrieve the updated profile information directly from the MSC 116. Updates to the profile information are eventually communicated back to the HLR 120 either at the elapse of a period of time, or when the subscriber no longer accesses the network, or at some other predetermined event. Once again, logic of the MSCs and the HLR may operate to enable these interactions.

Distributing the profile information among the network elements provides load balancing for updates to the profile information. Each update need not pass through a central location (for example, the HLR 120) at the time the update occurs. Rather, updates may be made on copies of the profile information by the network element that detects the update. Furthermore, network elements that request the profile information may be authenticated and authorized (for example by access control 144) and may then receive the most recent profile information from the network element(s) comprising the updated copies. The updates may later be communicated to a central location such as the HLR 120. The most recent profile information may be made available to queries and other database functions by employing logic of the HLR or other network element to create a "logical database" from the distributed profile information.

Figure 9:
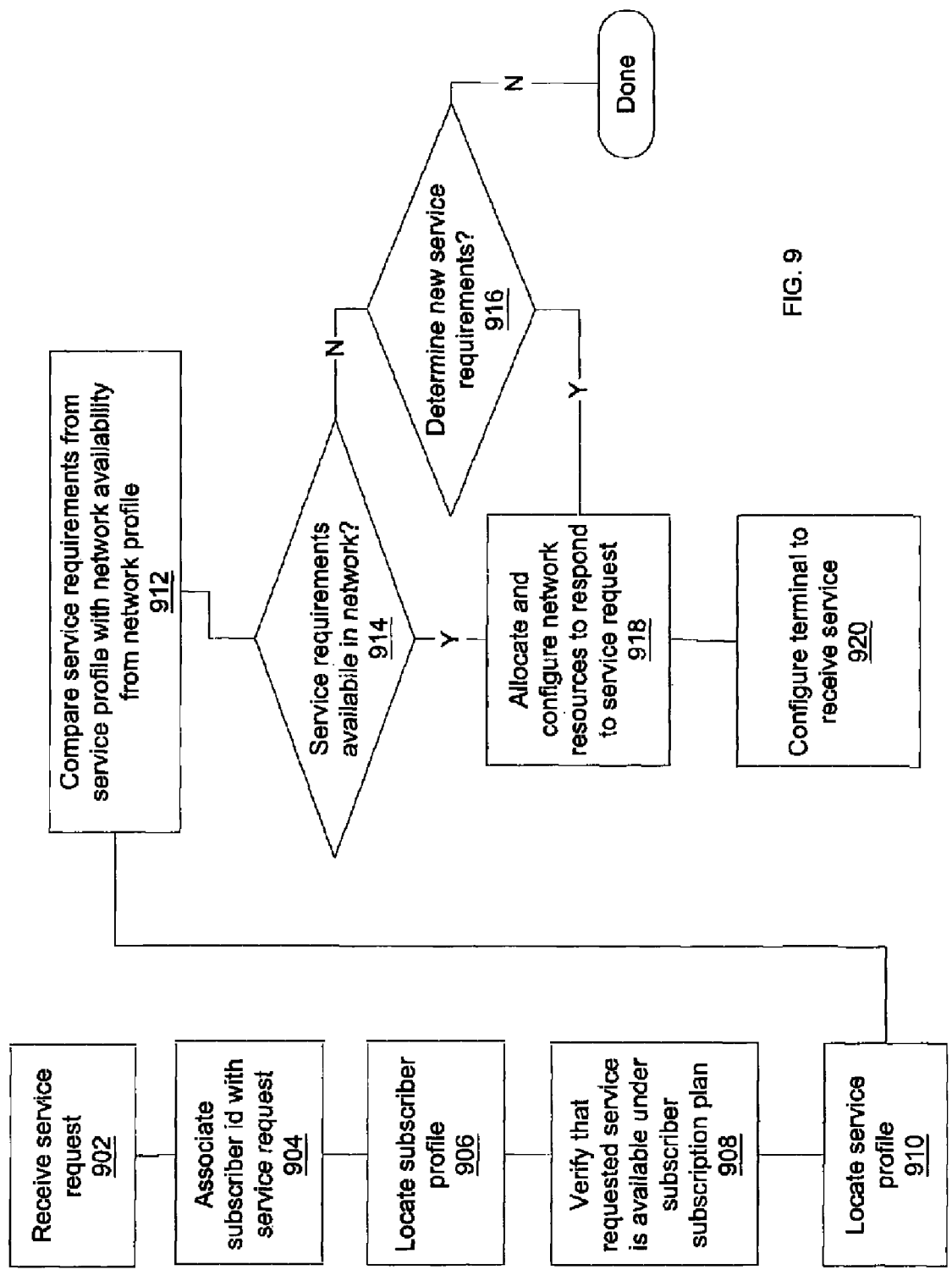
FIG. 9 is a flow chart of an embodiment of a method to respond to a service request.

FIG. 9 is a flow chart of an embodiment of a method to respond to a service request. A service request is received at 902 and associated with a subscriber id at 904. For example, a terminal, user, or other id comprised by the service request may be employed to identify a corresponding subscriber. The subscriber profile corresponding to the subscriber id is located at 906. At 908 it is verified that the requested service is available under the subscriber's subscription plan. If not, the service request may be denied, or the subscriber may be prompted to subscribe to the service.

A service profile for the requested service is located at 910. At 912 the service requirements from the service profile are compared with available network resources from the network profile. If the service requirements are not available in the network (914), new, less resource-demanding service requirements may be determined 916, for example by negotiation with the service provider. If determining new service requirements proves unsuccessful, the method concludes. If the service requirements are available in the network (914), or if new service requirements are determined at 916 that can be met, then at 918 network resources are allocated and configured to respond to the service request.

At 920 the terminal device is configured to receive the response to the service request. Configuration of the terminal device may involve accessing the terminal profile to ascertain settings and configuration options for the terminal device.

In one embodiment, the MSC receives the service request, associates a subscriber id with the service request, accesses the subscriber profile via the HLR to determine whether the subscriber is authorized to access the requested service, and receives the service profile from the HLR and allocates and configures network resources accordingly. Alternatively, the HLR may access the service profile and allocate and configure network resources accordingly. Logic of the MSC and/or HLR may operate to enable these actions.

Factors in determining the network resource requirements to respond to a service request may include the service requirements for the service delivery information and service provision information of the subscriber, and the subscriber's media delivery preferences.

In one embodiment a network element such as the HLR may identify other network elements, such as an MSC, to carry out the response to the service request. The identified network elements may then allocate and configure internal resources to carry out the response to the service request. An identified network element may provide an indication that it does not have the resources to carry out the response to the service request, in which case an alternative network element may be selected. Logic of the HLR and/or network element(s) may operate to enable these actions.

In one embodiment, information of the service requirements may also be provided to the terminal device to receive the service. The terminal device may employ the service requirement information to configure itself to properly receive the service information. Alternatively, the MSC or other network elements may employ the terminal information to configure the terminal to receive the service information. If the terminal capabilities do not permit the terminal to properly receive the service, an alternative may be found (for example, renegotiating the quality of service delivery, scheduling service delivery to a different terminal at a later time, and so on). Logic of the MSC may operate to enable these actions.

While certain features of the invention have been illustrated as described herein, many modifications, substitutions, changes and equivalents will now occur to those skilled in the art. It is, therefor, to be understood that the appended claims are intended to cover all such embodiments and changes as fall within the true spirit of the invention. In the claims, references to "a" or "an" element do not limit the claims to a single one of the element, but instead indicate one or more of the element, unless otherwise indicated.

What is claimed is:

1. A mobile switching center (MSC) on a network, the MSC comprising:
   a processor; and
   a non-transitory computer-readable medium in communication with the processor, the non-transitory computer-readable medium storing a logic that, when executed by the processor, causes the processor to perform operations including:
   accessing profile information from a subscriber profile associated with a subscriber of the network upon receiving a request for a service, the subscriber profile being stored on a Home Location Register (HLR) and including a plurality of user profiles of a plurality of users associated with the subscriber, a terminal profile of a terminal device used by each of the plurality of users, and a usage profile for the subscriber,
   identifying the subscriber that is the source of the request,
   accessing the profile information to verify that the subscriber is authorized to receive the requested service,
   accessing from the HLR a service profile for the requested service, and
   allocating network resources according to the service profile to deliver the service to one of the terminal devices in the subscriber profile.

2. The MSC of claim 1, wherein the HLR further comprises:
   a network profile comprising information about at least one of currently available network resources, expected demand for network resources, or currently allocated network resources.

3. The MSC of claim 1 wherein the non-transitory computer-readable medium further stores a copy of the profile information for the subscriber accessing the network via the MSC.

4. The MSC of claim 1 wherein the logic further causes the processor to perform operations comprising:
   updating the copies of the profile information according to usage of the network by the subscriber, and
   causing the updates to the profile information to be stored in the HLR.

5. The MSC of claim 1, wherein the request for the service is submitted in response to an error condition on the terminal device.

6. The MSC of claim 5, wherein the request includes terminal information, and wherein the terminal information is applied to remove the error condition.

7. The MSC of claim 1, wherein the logic further causes the processor to perform operations including identifying a service provider to provide the requested service and identifying network elements having sufficient resources available to provide the service.

8. The MSC of claim 1, wherein the logic further causes the processor to perform operations including negotiating a less resource demanding manner of delivering the service when sufficient network resources are unavailable to deliver the service.

9. The MSC of claim 1 wherein the logic further causes the processor to perform operations including configuring the terminal device to receive the service, in accordance with the service requirements.

10. A method comprising:
    utilizing a mobile switching center (MSC) including at least one processor for receiving a request for a service along with terminal information for a terminal device, the request being generated at the terminal device in response to a detection of an error condition at the terminal device;
    correlating the request for the service with a profile information retrieved from a subscriber profile stored on a Home Location Register (HLR), the subscriber profile including a plurality of user profiles of a plurality of users associated with a subscriber, a terminal profile of the terminal device used by one of the plurality of users associated with the subscriber, and a usage profile for the subscriber; and
    removing the error condition based in part upon the profile information and the terminal information.

11. The method of claim 10 further comprising:
    updating the terminal information stored at the HLR.

12. The method of claim 11 further comprising:
    accessing a copy of the terminal information, the copy stored by the MSC, wherein a master copy of the terminal information is stored at the HLR.

13. The method of claim 11 further comprising:
    accessing a copy of the terminal information, the copy stored by a Base Station Controller (BSC), wherein a master copy of the terminal information is stored by the HLR.

14. The method of claim 10, wherein removing the error condition further comprises:
    generating a template based upon the profile information; and
    allocating network resources according to the template and the profile information of the service requested.

15. The method of claim 10, further comprising:
    identifying a service provider to provide the requested service; and
    identifying network elements having sufficient resources available to provide the service.

16. The method of claim 15, further comprising:
    negotiating a less resource demanding manner of delivering the service when sufficient network resources are unavailable to deliver the service.

17. A non-transitory computer-readable medium coupled to a Mobile Switching Center (MSC), the non-transitory computer readable medium storing logic that enables a computer to:
    correlate profile information from a subscriber profile associated with a subscriber of the network with a request for a service, the subscriber profile being stored on a Home Location Register (HLR) and including a plurality of user profiles of a plurality of users associated with the subscriber, a terminal profile of a terminal device used by each of the plurality of users, and a usage profile for the subscriber, the request being generated at the terminal device in response to a detection of an error condition at the terminal device;
    identify the subscriber that is the source of the request;
    access the profile information to verify that the subscriber is authorized to receive the requested service;

access from the HLR a service profile for the requested service; and allocate network resources according to the service profile to deliver the service to one of the terminal devices in the subscriber profile.

18. The computer program product of claim 17, wherein the logic further enables the computer to:

determine a less resource demanding manner of delivering the service when sufficient network resources are not available to deliver the service.

19. The computer program product of claim 17, wherein the logic further enables the computer to:

configure a terminal device to receive the service, in accordance with the service requirements.

20. The computer program product of claim 17, wherein the logic further enables the computer to:

identify a service provider to provide the requested service; and identify network elements having sufficient resources available to provide the service.

* * * * *